Dec. 17, 1957 H. BARTH 2,816,709
DIFFERENTIAL PULSE COUNTER
Filed June 28, 1956
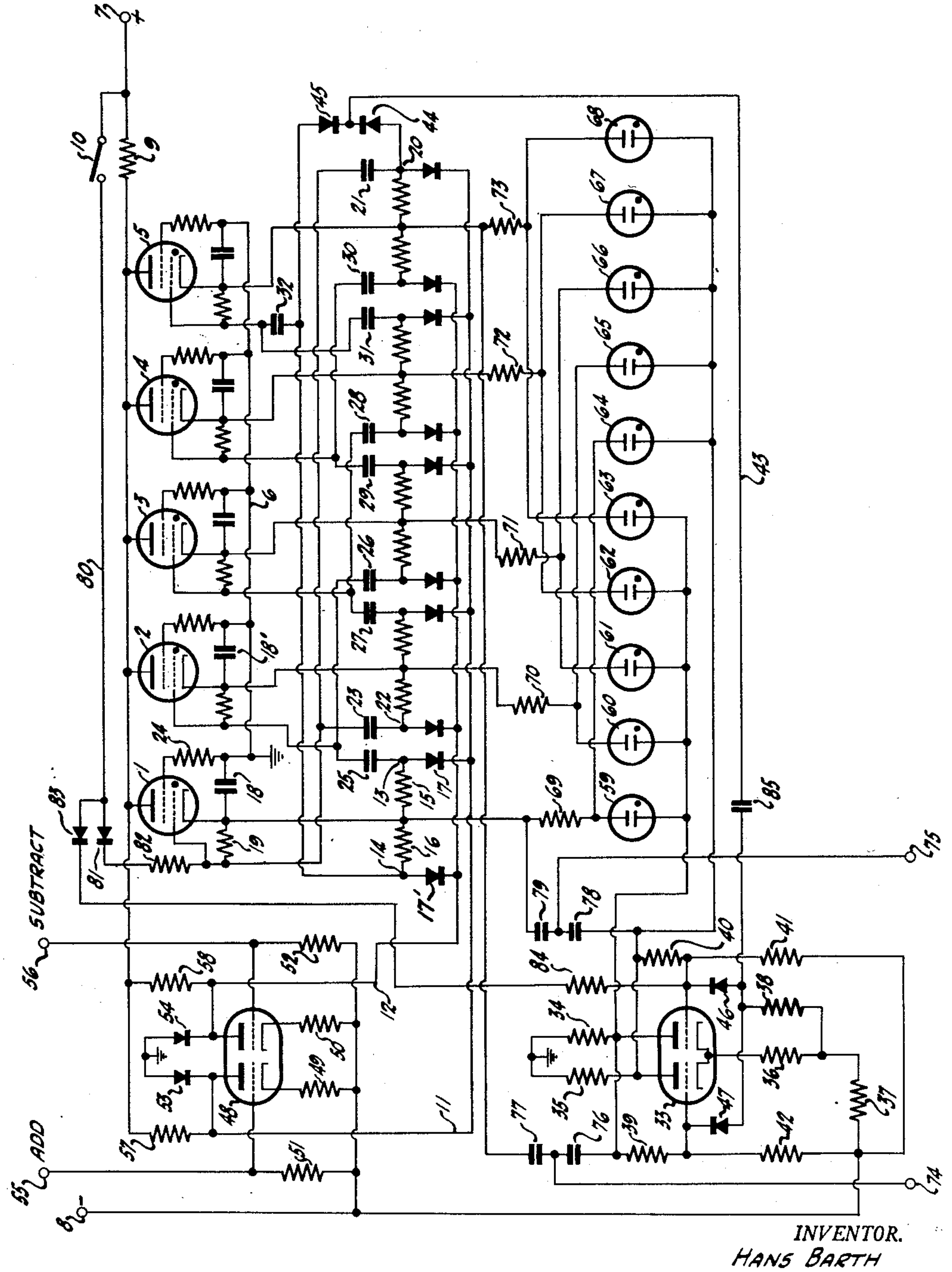
INVENTOR.
HANS BARTH
BY Lippincott + Smith
ATTORNEYS 2,816,709

DIFFERENTIAL PULSE COUNTER

Hans Barth, Palo Alto, Calif., assignor to O'Dell Brothers, Mountain View, Calif., a corporation of California Application June 28, 1956, Serial No. 594,470
17 Claims. (Cl. 235—92)

This invention relates to improvements in electronic counters for counting electric pulses, and in particular to improved differential pulse counters.

A differential pulse counter is additively responsive to electric pulses received at one input, is subtractively responsive to electric pulses received at another input, and continuously displays the numerical difference between the cumulative numbers of pulses received at the two inputs. Electronic counters are employed for high counting rates. The differential pulse counter usually includes a plurality of circuit stages arranged in sequence in a counting ring such that stable conduction of substantial current by only one at a time of such stages is permitted.

Coupling means are provided for transferring the conduction of current from a previously conducting one to the following one in sequence of such stages responsive to each input electric pulse received at the additive input, and for transferring the conduction of current from a previously conducting one to the preceding one in sequence of such stages responsive to each input electric pulse received at the subtractive input. Although differential pulse counters of this general type have been devised heretofore, such prior pulse counters have a number of defects that are eliminated by the present invention.

Electronic counting rings for differential and other types of pulse counters commonly employ a plurality of circuit stages each including one or more electric discharge devices of the gas tube type, called thyratrons. The circuit parameters of the ring circuit must be such that stable conduction of current by only one stage at a time is permitted, since the simultaneous "firing" of two or more stages, or the failure of a stage to "fire" at a proper time, or the inadvertent "firing" of a stage at an improper time, would result in inaccurate pulse counting. The prevention of such malfunctioning in prior counting rings has required great precision and stability of circuit parameters including tube characteristics, supply voltages, and circuit impedances. Accordingly, an object of this invention is to provide an improved electronic counting ring that is exceptionally stable and reliable in operation, despite reasonable and normally encountered variations and changes in tube characteristics, supply voltages, circuit impedances, and the like.

A further object is to provide a counting ring with non-critical circuit parameters such that reasonable and normally encountered changes in tube characteristics, supply voltages, and circuit impedances during long periods of operation, or upon replacement of tubes, or upon changes in environmental conditions such as ambient temperature, do not necessitate readjustment of the circuit to maintain stability and reliability of operation.

Another object is to provide a stable and reliable counting ring using commercially available inexpensive circuit components having electrical values that may vary within the tolerance limits of ordinary radio parts, and not requiring expensive high-precision components.

To insure stable operation and to prevent parasitic oscillations and the like in prior counting rings employing thyratrons, it has generally been necessary to employ coupling circuits having relatively long time constants, which has limited the use of such counting rings to rather low counting rates. For high counting rates, it has been necessary heretofore to use more complex counting circuits employing vacuum tubes and the like instead of thyratrons, despite the considerable advantages of thyratron counting rings with respect to circuit simplicity, adaptability to decade or scale-of-ten counting, reversibility, low grid current before ignition, and other considerations. Accordingly, another object of this invention is to provide stable and reliable counting rings using thyratrons with coupling circuits having exceptionally short time constants permitting very high counting rates, up to and exceeding 10,000 pulses per second, for example. The breakdown or "firing" voltage of thyratrons varies considerably from tube to tube and from time to time. In a multi-stage counting ring designed for even moderately high counting rates, this fact has heretofore necessitated the provision of precisely controlled and critical bias voltages to achieve reasonably stable and reliable operation, and the degree of criticality, and therefore the difficulty of providing and maintaining bias voltages with sufficiently precise values, increases as the number of stages in the counting ring increases. Another object of this invention is to provide simple self-regulating circuit means for individually biasing each thyratron in a counting ring to make possible stable and reliable operation at high counting rates in counting rings composed of many thyratron stages.

In prior thyratron counting rings the input and interstage coupling circuits have been such that reliable counting depends upon the input pulses having uniform and critical amplitudes and rise times, and substantial amounts of electrical power have had to be supplied to the input circuits because input pulses were commonly applied to all stages of the counting rings simultaneously. Another object of this invention is to provide improved thyratron counting rings in which each stage automatically and reliably supplies transfer pulses having constant and well-defined amplitudes and rise times for triggering other stages of the counting ring, in which reliable counting is not dependent upon input pulses of uniform or critical characteristics, in which little power is required by the input circuits, and in which input signals are supplied by circuit interruptions that may be provided by simple electronic or mechanical switches.

In prior differential pulse counters, complex and elaborate input and coupling circuits have been required to achieve selective forward and backward counting. Another object of this invention is to provide improved differential pulse counters having simplified input and coupling circuits capable of reliable operation at exceptionally high counting rates.

Another object is to provide an improved indicator circuit for continuously displaying the cumulative net number of pulses counted by a compound decade pulse counter consisting of a scale-of-two counting device in tandem with a scale-of-five counting ring.

Still another object is to provide an improved differential decade pulse counter consisting of a scale-of-two device in tandem with a scale-of-five counting ring, having simple and improved circuit means for supplying carry pulses to following decades.

Briefly stated, in accordance with certain aspects of this invention whereby the foregoing and other objects and advantages are achieved, a differential pulse counting ring consists of several stages coupled together in continuous repeating sequence, each stage including a thyratron. The anodes of all the thyratrons are connected together and are connected to a voltage supply terminal through a common resistor having a resistance such that stable conduction of substantial current by only one at a time of the thyratrons is permitted. An additive pulse input line and a subtractive input line form parts of two parallel cathode return circuits for the thyratron stages.

Each stage has a forward transfer terminal and a reverse transfer terminal, each of which is connected to the thyratron cathode through a separate cathode resistor. A diode rectifier is connected between the forward transfer terminal and the additive input line, and another diode rectifier is connected between the reverse transfer terminal and the subtractive input line. These two rectifiers are poled for conduction of current from the thyratron cathode to the input lines. The control grid of each thyratron is coupled to the forward transfer terminal of the preceding one in sequence of the counting ring stages, and is coupled to the reverse transfer terminal of the following one in sequence of the counting ring stages.

When the thyratron of a stage is conductive, the rectifiers of that stage present a low impedance to input positive electric pulses supplied selectively to respective ones of the input lines, while the rectifiers of non-conducting stages present a high impedance to such pulses. Consequently, each input pulse supplied to the additive input line transfers the conduction of current from a previously conducting one to the following one in sequence of the counting ring stages, and each input pulse supplied to the subtractive input line transfers the conduction of current from a previously conducting one to the preceding one in sequence of the counting ring stages.

Because the input lines are cathode return lines for the thyratrons, the triggering pulses may be produced simply by "opening" input circuit "switches" connected to respective ones of the two input lines for selectively interrupting respective ones of the parallel cathode return circuits. For high-speed counting, such interruption preferably is accomplished by means of fast-acting electronic switches.

Preferably the thyratrons are gas-filled tetrodes (type 2D21 thyratrons, for example) each having an anode, a shield grid, a control grid, and a cathode. A grid leak resistor is connected between the control grid and the cathode, and, according to an important aspect of the present invention, a bias-regulating high-resistance (usually between one and ten megohms) resistor is connected between the shield grid and a source of constant potential or ground. Pre-ignition current flowing into the shield grid produces a voltage drop (about 1 or 2 volts) across the bias-regulating resistor that maintains the shield grid at a small negative potential relative to cathode potential, which provides an individual self-regulating bias for each thyratron that insures stable and reliable operation of the counting ring without the necessity for providing precisely controlled bias supply voltages.

Furthermore, this novel self-biasing arrangement permits the use of coupling circuits having exceptionally small time constants (as small as 100 microseconds, or less) and as a result exceptionally high maximum counting rates (exceeding 10,000 pulses per second) are achieved in a simple and inexpensive thyratron counting ring.

By utilizing principles of this invention, stable and reliable high-speed counting rings can be constructed with a considerable number of thyratron counting stages. For example, ten thyratron stages can be arranged in sequence in a counting ring to provide a decade pulse counter. However, for compactness and economy, and for higher counting rates, it is desirable to construct a decade counter by coupling a scale-of-two counting device in tandem with a scale-of-five counting ring. The scale-of-two device may be a conventional vacuum tube bistable trigger circuit or flip-flop having two stable operating states. Novel coupling circuits are employed for triggering the flip-flop from one to the other of its stable states each time that the conduction of current is transferred directly from the fifth to the first in sequence of the counting ring stages and also each time that the conduction of current is transferred directly from the first to the fifth in sequence of the counting ring stages.

For continuously displaying the cumulative net number of pulses counted by the decade counter, there is provided an indicating circuit consisting of ten indicator lamps arranged in sequence. Each of the indicator lamps, which may be small neon glow lamps, has first and second terminals across which voltage may be applied to light the lamp. The first terminals of the ten lamps are connected together in groups of two, and each group of two is connected through a resistor to the thyratron cathode of a respective one of the five counting ring stages. The second terminals of the ten lamps are connected together in groups of five, and each group of five is connected to a respective one of two anode circuits of the bistable flip-flop, so that the indicating lamps are lit one at a time in sequence to display the cumulative net number of pulses counted by the decade counter.

It is frequently desirable to connect several decade counters in tandem so that large numbers of pulses can be counted. In such an arrangement, each decade must supply an additive carry pulse to the following decade whenever the cumulative net number that it has counted progresses directly (that is, without passing through a succession of intervening numbers) from nine to zero, and it must supply a subtractive carry pulse to the following decade each time that the cumulative net number that it has counted progresses directly from zero to nine. For this purpose each decade has two output terminals that are capacitively coupled to respective ones of the two anode circuits of the flip-flop. One of the output terminals is capacitively coupled to the cathode circuit of the first in sequence of the five counting ring stages, and the other of the output terminals is capacitively coupled to the fifth in sequence of the five counting ring stages. Large negative carry pulses are supplied to respective ones of the two output terminals only when negative pulses are supplied thereto by the counting ring and the flip-flop simultaneously, so that additive carry pulses are supplied to one output terminal at proper times and subtractive carry pulses are supplied to the other output terminal at proper times.

The invention will be better understood from the following detailed description of an illustrative embodiment taken in connection with the accompanying drawing, and its scope will be pointed out in the appended claims.

In the drawing, the single figure is a simplified circuit diagram of a differential decade pulse counter embodying principles of this invention.

Referring now to the drawing, a scale-of-five counting ring consists of five circuit stages each including one of five thyratrons identified in the drawing by reference numerals 1 through 5. Each thyratron is a gas-filled tetrode (such as a type 2D21 thyratron) having an anode, a shield grid (sometimes called grid No. 2) or electrode, a control grid (sometimes called grid No. 1) or electrode, and a cathode, as indicated in the drawing by conventional symbols familiar to those skilled in the art.

A reference potential line 6 is connected to ground or its circuit equivalent, as indicated in the drawing, or is connected to any equivalent source of substantially constant electric potential. A first voltage supply terminal 7 provides a constant positive electric potential (plus 250 volts, for example) and a second voltage supply terminal 8 provides a constant negative electric potential (minus 150 volts, for example) relative to the potential of reference potential line 6. These supply potentials may be produced by any conventional voltage supply means (not shown) connected to line 6, terminal 7 and terminal 8.

The anodes of all five of the thyratrons 1 through 5 are connected together and are connected to terminal 7 through a resistor 9 having a resistance (about 80,000 ohms in the illustrative example) such as to permit stable conduction of substantial current by only one at a time of the five thyratrons. In other words, as is well known to those skilled in the art, when a thyratron is once "fired" to the conductive condition it continues to conduct current so long as sufficient voltage is provided between its anode and its cathode. This current produces across resistor 9 a voltage drop that lowers the anode potentials of the thyratrons to a value just sufficient to maintain the conduction of current through the conductive thyratron.

Therefore, the resistance of resistor 9 (plus cathode circuit resistances) regulates the total amount of current that can flow through the five thyratrons connected in parallel. A certain minimum amount of anode current, depending upon the specific type of thyratron employed, is required to maintain conduction in the conducting thyratron. The resistance of resistor 9 is chosen to permit the flow of more current than is required to maintain conduction in one thyratron, but less current than is required to maintain conduction in two thyratrons simultaneously; so that whenever an additional thyratron is "fired," the previously conducting thyratron is extinguished. This well-known principle is commonly employed in thyratron counting rings, and requires no further explanation.

The five circuit stages containing thyratrons 1 through 5 are arranged in continuous repeating sequence to form a scale-of-five counting ring wherein the conduction of current can be transferred from one stage to another in sequence, either in a forward or in a backward direction, selectively. In other words, for additive pulse counting the conduction of current is transferred in sequence to thyratrons 1, 2, 3, 4, 5, 1, 2, 3, etc., in the order named; and for subtractive pulse counting the conduction of current is transferred in sequence to thyratrons 1, 5, 4, 3, 2, 1, 5, 4, etc., in the order named.

The thyratron that is conductive at a given time represents the numerical difference between the cumulative number of additive pulse counts and the cumulative number of subtractive pulse counts that have occurred up to that time. A reset switch 10 may be provided for resetting the counter to zero whenever desired, as is hereinafter more fully explained. The conduction of current is transferred from one to another of the five thyratrons by counting-ring input positive electric pulses (in synchronism with and controlled by but not necessarily the same as the input pulses supplied to input terminals of the decade counter) supplied selectively to respective ones of an additive pulse input line 11 and a subtractive input pulse line 12. Preferably, the pulses at lines 11 and 12 are produced by momentarily interrupting circuits connected to the two input lines, so that the cathode current flowing from a conducting thyratron to the input line causes a suddent rise of potential therein.

The five circuit stages containing thyratrons 1 through 5 are identical. Each such stage (for example, the stage containing thyratron 1) has a forward transfer terminal 13 and a reverse transfer terminal 14. A cathode resistor 15 is connected between the cathode of thyratron 1 and forward transfer terminal 13, and another cathode resistor 16 is connected between the cathode of thyratron 1 and reverse transfer terminal 14.

A rectifier 17 is connected between forward transfer terminal 13 and additive input line 11, and a rectifier 17' is connected between reverse transfer terminal 14 and subtractive input line 12. These rectifiers, which may conveniently be small germanium diodes (type 1N34, for example), are asymmetrically conductive devices that present a small resistance, commonly called the "forward" resistance, to current flow in one direction, and present a much larger resistance, commonly called the "backward" resistance, to current flow in the opposite direction. The rectifiers are poled for best conduction of current from the thyratron cathode to input lines 11 and 12, so that the current of a conducting thyratron is readily conducted by rectifiers 17 and 17', normally in substantially equal amounts, to the input lines 11 and 12.

Therefore, the two input lines 11 and 12 are in effect cathode return lines for the thyratrons. Lines 11 and 12 are normally maintained at electric potentials substantially equal to that of reference potential line 6 by input circuits, hereinafter more fully described, that can be interrupted selectively to permit the potential at a selected one of lines 11 and 12 to rise and provide positive input pulses for transferring the conduction of current from one to another of the five thyratrons.

The cathode of each thyratron (thyratron 1, for example) is connected to reference potential line 6, or other source of substantially constant electric potential, through a cathode by-pass capacitor 18. Alternatively, the by-pass capacitors may be connected between the cathodes of successive thyratrons, but the connection shown is preferred for high-speed counting. The control grid is connected to the cathode of the thyratron through a grid leak resistor 19 (which may, for example, have a resistance of about 270,000 ohms), is connected to the forward transfer terminal 20 of the preceding one in sequence of the five thyratron circuit stages through a coupling capacitor 21, and is connected to the reverse transfer terminal 22 of the following one in sequence of the five thyratron circuit stages through a coupling capacitor 23. The coupling capacitors 21 and 23 preferably have capacitance values smaller than about 100 micro-microfarads, usually about ten micro-microfarads each. A bias-regulating resistor 24 is connected between the shield grid of the thyratron and reference potential line 6.

Each of the remaining thyratron circuit stages preferably is identical to the stage just described, and therefore the remaining stages will not be described in detail. However, it may be noted that the control grid of thyratron 2 is connected to forward transfer terminal 13 of the preceding stage through a coupling capacitor 25 and is connected to the reverse transfer terminal of the following stage through a coupling capacitor 26; that the control grid of thyratron 3 is connected to the forward transfer terminal of the preceding stage through a coupling capacitor 27 and is connected to the reverse transfer terminal of the following stage through a coupling capacitor 28; that the control grid of thyratron 4 is connected to the forward transfer terminal of the preceding stage through a coupling capacitor 29 and is connected to the reverse transfer terminal of the following stage through a coupling capacitor 30; and that the control grid of thyratron 5 is connected to the forward transfer terminal of the preceding stage through a coupling capacitor 31 and is connected to reverse transfer terminal 14 of the following stage through a coupling capacitor 32. Since the five thyratron stages are arranged in a continuous repeating sequence or ring, the circuit stage containing thyratron 1 follows the stage containing thyratron 5.

For a better understanding of how the scale-of-five counting ring operates, assume that thyratron 1 is initially conductive, which may be the circuit state representing a zero count. The resistance of cathode resistors 15 and 16 (about 10,000 ohms each, for example) is large compared to the forward resistance of diode rectifiers 17 and 17' but is small compared to the backward resistance of the rectifiers. Resistor 9 also has a fairly large resistance (usually more than 10,000 ohms), and the resistance of the conducting thyratron is relatively small (the voltage drop across a conducting thyratron of the 2D21 type is about 8 volts). Consequently the voltage drops across the conducting thyratron 1 and the conducting rectifiers 17 and 17′ are small fractions of the supply voltage, and the amount of current flowing from terminal 7 through thyratron 1 to input lines 11 and 12 is chiefly determined by the resistances of resistors 9, 15 and 16.

Therefore, the amount of current flowing in the counting ring circuit is substantially independent of the characteristics of the thyratrons and the rectifiers, and is not materially affected by reasonable and normally encountered variations in such characteristics due to aging, tube replacement, and changes in environmental conditions. Furthermore, the current value is not critical, and precision resistors are not required. In fact, ordinary commercially available resistors intended for use in inexpensive radio receivers are quite adequate. The current flowing into lines 11 and 12 is returned to the voltage supply (terminal 8) through an input circuit that normally maintains lines 11 and 12 at electric potentials substantially equal to that of reference potential line 6.

Now assume that a positive electric pulse is supplied to additive input line 11 by any suitable means. As line 11 becomes more positive, the amount of current flowing through rectifier 17 is reduced and preferably is substantially cut off. Consequently, the electric potential of forward transfer terminal 13 suddenly rises to a value substantially equal to the cathode potential of thyratron 1, and a large positive electric pulse (about 40 volts) is transmitted through coupling capacitor 25 to the control grid of thyratron 2.

This pulse "fires" thyratron 2, and momentarily thyratrons 1 and 2 both conduct current. However, the resistance of resistor 9 is too large to permit continual conduction of current by two of the thyratrons simultaneously, and when thyratron 2 "fires" the additional current through resistor 9 causes the anode potentials of the thyratrons to drop suddenly to a value below the minimum potential required to maintain conduction of thyratron 1. In other words, immediately after thyratron 2 is "fired" by the positive transfer pulse supplied to its control grid, cathode by-pass capacitor 18′ momentarily maintains the cathode of thyratron 2 substantially at reference potential (zero volts) and the anode potential of all five thyratrons drops to about eight volts positive, since the voltage drop across conductive thyratron 2 is about eight volts. Cathode by-pass capacitor 18 momentarily maintains the cathode of previously conducting thyratron 1 at its former value (about 80 volts positive) produced by the voltage drop across cathode resistors 15 and 16, so that the anode of thyratron 1 is momentarily at a negative potential relative to its cathode. Consequently, thyratron 1 is extinguished and ceases to conduct current. The increase in the rise time of the cathode potential of thyratron 2 produced by capacitor 18′, in combination with the drop in the anode potentials of all five thyratrons immediately after thyratron 2 "fires," prevents the inadvertent improper "firing" of thyratron 3 by a pulse transmitted through capacitor 27 when thyratron 2 "fires" while line 11 is positive.

In this way each input positive electric pulse supplied to additive input line 11 transfers the conduction of current from a previously conducting one to the following one in sequence of the five thyratrons. In other words, a positive electric pulse supplied to line 11 while thyratron 2 is conducting transfers the conduction of current to thyratron 3; a positive electric pulse supplied to line 11 while thyratron 3 is conducting transfers the conduction of current to thyratron 4; a positive electric pulse supplied to line 11 while thyratron 4 is conducting transfers the conduction of current to thyratron 5; and a positive electric pulse supplied to line 11 while thyratron 5 is conducting transfers the conduction of current to thyratron 1.

In a similar way, each input positive electric pulse supplied to subtractive input line 12 transfers the conduction of current from a previously conducting one to the preceding one in sequence of the five thyratrons. For example, assume that thyratron 1 is conducting and that a positive electric pulse is supplied to line 12. This pulse substantially cuts off the current flow through rectifier 17′, and the potential of reverse transfer terminal 14 ries suddenly so that a large positive pulse is supplied through coupling capacitor 32 to the control grid of thyratron 5. This "fires" thyratron 5, which in turn extinguishes thyratron 1.

Successive input pulses may be supplied to input lines 11 and 12 in any sequence, and the conduction of current will be transferred forward one stage in the ring circuit sequence responsive to each pulse supplied to additive input line 11, and will be transferred backward one stage in the ring circuit sequence responsive to each pulse supplied to subtractive input line 12. The stage that is conducting at any time represents the numerical difference between the cumulative number of pulses supplied to the additive input line 11 and the cumulative number of pulses supplied to subtractive input line 12 up to that time.

As hereinbefore explained, thyratron 2 is fired whenever an input positive electric pulse is applied to additive input line 11 while thyratron 1 is conducting. The positive pulse supplied to line 11 at this time does not fire thyratrons 3, 4, and 5 because the high back resistance of the non-conducting diode rectifiers prevents the transmission of any appreciable portion of the input pulse to the control grid of any thyratron except the one next in sequence to the previously conducting thyratron. In other words, the diode rectifiers act as "steering" devices whereby only the proper one in sequence of the five thyratrons is "fired" by an input pulse. Although pulse "steering" triggering circuits, sometimes employing diode rectifiers as well as other non-linear circuit elements, have previously been employed in pulse counters and elsewhere, the present circuits are unique and advantageous in several respects.

Heretofore the "steering" circuit elements have usually been used as voltage-responsive switching devices, in consequence of which reliable operation of a counting ring has depended upon rather precise constancy of circuit parameters, including the voltage-responsive characteristics of the "steering" devices, the amplitudes and rise times of the input pulses, tube characteristics, and the like.

In the present circuit, the diode rectifiers are merely current-switching devices, and their characteristics may vary within exceptionally broad tolerance limits without adversely affecting circuit reliability. Furthermore, the pulse input circuit does not have to deliver any power to the counting ring. In fact, the input circuit may simply interrupt the current return path from selective ones of the input lines 11 and 12, and the electric potential of the selected line will automatically rise because of the current supplied to that line by the conducting thyratron. Thus, in effect, the counting ring supplies its own input pulses responsive to a simple switching operation which may be performed by a simple electronic or mechanical switch.

Assume that the input circuit "switches" are closed to maintain input lines 11 and 12 at electric potentials substantially the same as that of reference potential line 6, and that thyratron 1 initially conducts current. Substantially equal amounts of the current conducted by thyratron 1 flow through resistors 15 and 16 into input lines 11 and 12, respectively, from which the current is returned to the voltage supply (terminal 8) through the input circuit "switches." While thyratron 1 is conducting, its cathode is at a positive potential, relative to line 6, having a value that is chiefly determined by the resistances of resistors 9, 15, and 16, and that is substantially unaffected by reasonable and commonly encountered changes in the characteristics of the thyratrons and the rectifiers due to aging, changes in environmental conditions such as ambient temperature, tube replacement, and the like.

Now assume that the input "switch" that returns current from line 11 to the voltage supply is suddenly opened. Current flowing through rectifier 17 from the cathode of thyratron 1 can no longer return to the voltage supply, and this current quickly charges the small wiring capacitances of the circuit to raise line 11 to a positive electric potential substantially equal to that at the cathode of thyratron 1, whereupon the further flow of current through resistor 15 and rectifier 17 is substantially cut off. As this occurs the electric potential of forward transfer terminal 13 suddenly rises from a very small positive value (substantially zero potential) to a value substantially equal to the cathode potential of thyratron 1 (about 80 volts positive, for example) and there is supplied through coupling capacitor 25 to the control grid of thyratron 2 a positive electric pulse having a rather large amplitude (about 40 volts) and short rise time (a few microseconds), both of which are determined by the circuit characteristics of the counting ring.

Because of the large backward resistance of the non-conducting diode rectifiers, the sudden rise in the potential of line 11 transmits pulses of negligible amplitude to the control grids of thyratrons 3, 4, 5 and 1. Thus the counting circuit itself provides uniform transfer pulses for triggering successive stages at proper times, and operational reliability is not dependent upon the characteristic of input pulses supplied to the counter by external means.

The circuit can easily be designed so that the transfer pulses are considerably larger than the minimum required to fire the proper thyratron, while pulses transmitted through the high backward resistances of non-conducting rectifiers are considerably smaller than the minimum that might inadvertently cause improper "firing" of other thyratrons. Consequently, even the circuit resistances and supply voltages are not critical, so that inexpensive commercially available radio components may be used.

As hereinbefore explained, the cathode by-pass capacitors 18 assist in the reliable transfer of current conduction from a previously conducting one to the proper one in sequence of the five thyratrons responsive to each input pulse by preventing a too-rapid change in the thyratron cathode potentials. Furthermore, by-pass capacitors 18 stabilize the thyratron circuits by suppressing parasitic oscillations in and between the several thyratron stages that otherwise would tend to produce erratic changes in the current conduction, transfers of conduction to improper stages and at improper times, and inaccurate and unreliable pulse counting. Therefore the capacitors 18 connecting the thyratron cathodes to the reference potential line 6 are made as large as necessary to insure circuit stability and reliability of operation. On the other hand, these capacitors should be no larger than necessary, since an increase in their capacitance decreases the maximum pulse-counting rate of the ring circuit.

The maximum pulse-counting rate of the counting ring (the maximum number of pulses that can be counted per second) and likewise the "resolution" of the counting ring (the minimum interval between successive pulses that can be counted) are limited chiefly by the time constants of resistance-capacitance networks in the circuit, and in particular by the time constants of the networks including a capacitor 18, cathode resistors 15 and 16, and anode resistor 9. If circuit stability and reliability requires the use of capacitors 18 having large values of capacitance, and cathode resistors 15 and 16 having large values of resistance, networks with relatively long time constants will result, and the maximum pulse-counting rate of the circuit will be low. Heretofore this fact has limited the maximum counting rate of gas tetrode counting rings to the order of a few hundred pulses per second.

According to the present invention, circuit stability is greatly increased by novel, individual self-regulating biasing means for each thyratron, hereinafter more fully described, so that stable operation without parasitic oscillations, and reliable accurate pulse counting, can be accomplished with much smaller circuit resistances and capacitances that has been practicable heretofore. As a result, counting rates exceeding 10,000 pulses per second have been achieved.

The breakdown or "firing" voltage of thyratrons varies considerably from tube to tube and from time to time. In a fast pulse-counting circuit, it is desirable that the thyratrons be biased just below the "firing" potential so that the thyratrons can be "fired" quickly and reliably by relatively small triggering pulses. Therefore the value of the bias potential in a fast pulse-counting circuit is quite critical, and the degree of criticality increases with increases in the number of stages included in a counting ring. According to the present invention, the necessity for precisely regulated supply means providing critical bias voltages is eliminated by simple circuit means whereby each thyratron is individually biased in a self-regulating manner.

Each of the gas-filled tetrodes 1 through 5 may advantageously be a type 2D21 thyratron, which is an inexpensive commercially available tube having characteristics suitable for the present application. In a thyratron of this type, if the control grid and the shield grid are both at cathode potential the thyratron will "fire" as soon as normal positive potential is supplied to the anode. Therefore a negative bias potential must be provided at one or both of the grids so that the thyratron will not "fire" until a positive pulse is supplied to the control grid.

In accordance with the present invention, the required negative bias is provided by connecting the shield grid to reference potential line 6, or some equivalent source of constant electrical potential, through a bias-regulating resistor 24 having a large resistance, generally between 1 and 10 megohms. When the thyratron is substantially non-conducting or "unfired," a small pre-ignition current (several tenths of a micro-ampere) nevertheless flows to the shield grid, and this pre-ignition current flowing through resistor 24 produces a voltage drop (usually 1 or 2 volts) that biases the shield grid to a small negative potential. By proper choice of the resistance of resistor 24, the optimum value being easily determined experimentally, the value of the negative bias potential thus supplied to the shield grid can be made such that the thyratron will not "fire" until a small positive potential is applied to the control grid. The resistance value of bias-regulating resistor 24 is not extremely critical, and for circuits using type 2D21 and similar thyratrons any resistance value between 1 and 10 megohms is usually satisfactory.

It has been found that this biasing means is self-regulating to a high degree, so that, once the proper value of resistor 24 has been obtained, the bias potential automatically adjusts itself to a suitable value despite reasonable and normally expected changes in the characteristics of the tubes or other circuit components.

A further and very important advantage of the shield grid self-biasing circuit herein described is that it greatly assists in stabilizing the thyratron operation, so that the time constants of other circuit networks can be greatly reduced to increase the maximum counting rate of the counter. Specifically, capacitor 18 can have a much smaller capacitance value (0.003 microfarad, for example) than would otherwise be possible without thyratron instability or the generation of parasitic oscillations. By this means pulse counting rates exceeding 10,000 pulses per second have been achieved, which is an exceptionally high counting rate for thyratron counting ring circuits.

Because of the stable characteristics of the counting rings embodying principles of this invention, reliable thyratron counting rings containing a large number of stages can be constructed for operation at reasonably high counting rates. For example, a ten-stage ring can be constructed to form a scale-of-ten circuit useful as a decade counter. However, for compactness and economy of tubes and other circuit components, as well as for greater maximum counting rates, it is more desirable to construct a decade or scale-of-ten counter from a scale-of-two counting device coupled in tandem to a scale-of-five counting device. Accordingly, as illustrated in the drawing, the thyratron counting ring contains five stages connected as a scale-of-five counting ring.

The scale-of-two device may advantageously be a conventional bistable trigger circuit or flip-flop employing two vacuum tube sections each including an anode, a control grid and a cathode. The two vacuum tube sections may conveniently be the two halves of a twin triode vacuum tube 33, or equivalent electron discharge devices. Anode resistors 34 and 35 are connected between reference potential line 6, or ground, and respective ones of the two vacuum tube anodes. The two vacuum tube cathodes are connected together, either inside or outside of tube 33, or they are included in a single cathode structure. The vacuum tube cathodes are connected to the negative voltage supply terminal 8 through two cathode resistors 36 and 37 in series.

A resistor 39 is connected between the anode of a first one of the two vacuum tube sections and the control grid of the second one of the two vacuum tube sections. A resistor 40 is connected between the anode of the second vacuum tube section and the control grid of the first vacuum tube section. Resistors 41 and 42 are connected between negative supply terminal 8 and respective ones of the two vacuum tube control grids.

Whenever one vacuum tube section is conductive, the other section is biased to cut-off, so that stable conduction of current by only one-at-a-time of the two vacuum tube sections is permitted. Preferably, the voltage dividers 39—42 and 40—41 are designed so that the control grid of the conducting section of tube 33 is slightly positive with respect to the cathodes, and draws a small amount of grid current. The conduction of current can be transferred from one vacuum tube section to the other by suitable triggering pulses, which may be positive electric pulses supplied to the two control grids. Thus twin triode 33 is connected in a conventional bistable trigger or flip-flop circuit having two stable operating states. Since such flip-flops are well known, no further description thereof is necessary.

To make a decade counter, it is necessary that the flip-flop be triggered from one to the other of its two operating states each time that the conduction of current is transferred directly (that is, without conduction by intervening thyratrons) from thyratron 5 to thyratron 1, and also each time that the conduction of current is transferred directly from thyratron 1 to thyratron 5. For this purpose a carry pulse line 43 is connected to forward terminal 20 of the fifth in sequence of the five thyratron stages through a diode rectifier 44, and is connected to the reverse transfer terminal 14 of the first in sequence of the five thyratron stages through a diode rectifier 45. Rectifiers 44 and 45 are poled to conduct positive electric pulses from the transfer terminals to carry the pulse line 43.

Whenever the conduction of current is to be transferred directly from thyratron 5 to thyratron 1, a positive electric transfer pulse is provided at transfer terminal 20 in the manner hereinbefore explained, and a positive electric pulse is transmitted through rectifier 44 to carry line 43. Similarly, whenever the conduction of current is to be transferred directly from thyratron 1 to thyratron 5, a positive electric transfer pulse is provided at transfer terminal 14, in the manner hereinbefore explained, and a positive pulse is transmitted through rectifier 45 to carry line 43. As a result, carry line 43 receives positive electric pulses at the appropriate times for triggering the bistable flip-flop. So that these pulses will trigger the flip-flop, carry line 43 may be connected to the two control grids of twin triode 33 through a D.-C. blocking capacitor 85 and two rectifiers 46 and 47 poled for the conduction of positive pulses from the carry line to the flip-flop control grids, as shown.

A resistor 38 is connected between the left side of capacitor 85 and the circuit junction of cathode resistors 36 and 37. Resistor 38 (about one megohm) assists in discharging capacitor 85 after each carry pulse, and thus increases the speed and reliability of operation. The relative values of resistors 36 and 37 establish the negative bias voltage applied to the control grid of the non-conducting vacuum tube section, and thus establish the sensitivity of the flip-flop (the minimum amplitude of the positive triggering pulses needed to change the state of the flip-flop). Diodes 46 and 47 isolate line 43 from the positive control grid of tube 33, so that the bistable flip-flop has a high input impedance at all times. This prevents loading of the scale-of-five circuit that might otherwise produce unreliable operation.

As hereinbefore explained, the conduction of current preferably is transferred from one to another of the five thyratrons in the scale-of-five counting ring by momentarily interrupting one of the two cathode return circuits that include input lines 11 and 12, respectively. For high-speed pulse counting, this circuit interruption is preferably performed by electronic switches that will now be described. The electronic switches or input circuit of the decade pulse counter include two electron discharge devices, which preferably are the two sections of a twin triode vacuum tube 48.

Each section of tube 48 has an anode, a control grid and a cathode. The two cathodes of tube 48 are connected to negative voltage supply terminal 8 through two cathode resistors 49 and 50, as shown. The two control grids of tube 48 are connected to terminal 8 through two grid leak resistors 51 and 52. The two anodes of tube 48 are connected to reference potential line 6, or to ground, by two diode rectifiers 53 and 54 connected to respective ones of the two anodes and poled for the conduction of current to the anodes, as shown.

Input line 11 of the counting ring is connected to the anode of a first one, and input line 12 of the counting ring is connected to the anode of a second one of the two sections of twin triode 48. The control grid of the first section of tube 48 is connected to an additive pulse input terminal 55, and the control grid of the second section of tube 48 is connected to a subtractive pulse input terminal 56. Both sections of tube 48 are normally conductive, and current supplied to lines 11 and 12 by the conductive one of thyratrons 1 through 5 flows through tube 48 and is returned to the voltage supply at terminal 8. Additional current flows through rectifiers 53 and 54 and tube 48 in sufficient amounts, in an automatic self-regulating manner, to maintain lines 11 and 12 normally at electric potentials substantially equal to that of reference potential line 6.

For additive pulse counting, negative electric pulses are supplied to additive input terminal 55 of the decade pulse counter. Each negative pulse supplied to terminal 55 momentarily cuts off the left section of tube 48 and thus interrupts the current return circuit between line 11 and the voltage supply. When this happens, the potential of line 11 rises suddenly, as hereinbefore explained, and the conduction of current is transferred from a previously conducting one to the following one in sequence of the five thyratrons 1 through 5.

For subtractive pulse counting, negative electric pulses are supplied to subtractive input terminal 56 of the decade pulse counter. Each negative pulse supplied to terminal 56 momentarily cuts off the right section of tube 48 and thus interrupts the return circuit between line 12 and the voltage supply. Whenever this happens the potential of line 12 rises suddenly, as hereinbefore explained, and the conduction of current is transferred from a previously conducting one to the preceding one in sequence of the five thyratrons 1 through 5.

Although the backward resistance of diode rectifiers 17 and 17′ of the counting ring is much higher than the forward resistance, a relatively small current may flow backward through each substantially nonconductive diode rectifier. In a multi-stage counting ring having many such rectifiers, the total amount of such backward current, though small, is appreciable, and this tends to reduce the amplitudes and rise times of the positive pulses produced in lines 11 and 12 upon interruption of the circuits through tube 48.

To compensate for this backward current, and to produce in lines 11 and 12 pulses having larger amplitudes and shorter rise times, resistors 57 and 58 may be connected as shown between lines 11 and 12 and the thyratron anodes or some other source of positive electric potential. While both sections of tube 48 are conducting, the current transmitted by resistors 57 and 58 flows through tube 48 and has no appreciable effect on the normal electric potentials of lines 11 and 12.

When an input negative pulse is supplied to terminal 55 and the left section of tube 48 is cut off, current flows through resistor 57 to line 11 to compensate, or to overcompensate, for the current flowing from line 11 backward through the substantially nonconductive rectifiers of the thyratron counting ring and to produce in line 11 a positive pulse having a larger amplitude and shorter rise time than would otherwise be produced. Similarly, current flows through resistor 58 to line 12 whenever the right section of tube 48 is cut off by a negative input pulse supplied to subtractive input terminal 56. By this means the speed and reliability of operation of the thyratron counting ring is increased.

Immediately upon the "firing" of a previously nonconducting thyratron, the thyratron anode potentials drop suddenly, as hereinbefore explained, and the flow of current through resistors 57 and 58 substantially stops. This prevents an unnecessarily large rise in the potential of line 11 or line 12, and aids in rapid recovery of the reference potential at the input lines upon resumption of conduction by both sections of tube 48 so that the circuit will be ready to count the next input pulse. Thus the connection of resistors 57 and 58 to the thyratron anode, as shown, materially assists high-speed pulse counting.

For continuously displaying the cumulative net number of pulses counted by the counting ring, there are provided ten indicator lamps, identified by reference numbers 59 through 68, arranged in sequence. Each of these ten lamps may be a small neon lamp having first and second terminals for receiving voltage to light the lamp. As is well known, such lamps are lit only when the voltage applied across the two terminals exceeds a certain minimum value that depends upon the lamp design or type.

The first terminals of the ten lamps are connected together in groups of two. That is, the first terminal of the first one 59 is connected to the first terminal of the sixth one 64 in the sequence of ten lamps, the first terminal of the second one 60 is connected to the first terminal of the seventh one 65, the first terminal of the third one 61 is connected to the first terminal of the eighth one 66, the first terminal of the fourth one 62 is connected to the first terminal of the ninth one 67, and the first terminal of the fifth one 63 is connected to the first terminal of the tenth one 68. The first terminals of lamps 59 and 64 are connected through a current-limiting resistor 69 to the cathode of thyratron 1. The first terminals of lamps 60 and 65 are connected through a resistor 70 to the cathode of thyratron 2. The first terminals of lamps 61 and 66 are connected through a resistor 71 to the cathode of thyratron 3. The first terminals of lamps 62 and 67 are connected through a resistor 72 to the cathode of thyratron 4. And the first terminals of lamps 63 and 68 are connected through a resistor 73 to the cathode of thyratron 5. Each of the resistors 69–73 may have a resistance of about 50,000 ohms.

The second terminals of the first five lamps in sequence, lamps 59 through 63, are connected together and are connected to the anode of the first or right section of vacuum tube 33. The second terminals of the second five lamps in sequence, lamps 64 through 68, are connected together and are connected to the anode of the second or left section of vacuum tube 33.

The characteristics of lamps 59 through 68 are such that "firing" voltage is applied to a lamp only when the thyratron and the vacuum tube section to which it is connected are both conductive. Consequently, lamps 59 through 68 are lit one at a time in sequence by the decade counter, and the lamp that is lit represents the numerical difference between the cumulative number of additive pulses and the cumulative number of subtractive pulses counted.

It is frequently desirable to connect several decade or scale-of-ten counters in tandem, so that multi-digit net counts larger than ten can be handled. In such a case, each decade must supply additive and subtractive carry pulses to the following decade at proper times.

For this purpose the decade counter illustrated has two output terminals 74 and 75, which may be connected to the additive and subtractive input terminals, respectively, of a following decade, which may be identical to the decade counter illustrated. Additive carry output terminal 74 is coupled to the anode of the first or right section of vacuum tube 33 through a coupling capacitor 76, and is coupled to the cathode of thyratron 5 through a coupling capacitor 77. Subtractive carry output terminal 75 is coupled to the anode of the second or left section of vacuum tube 33 through a coupling capacitor 78, and is coupled to the cathode of thyratron 1 through a coupling capacitor 79. With this arrangement, negative carry pulses of sufficient amplitude to trigger the following decade are provided at terminals 74 and 75 only at the proper times for correct multi-digit decimal or scale-of-ten differential pulse counting.

Reset switch 10 may be a normally open switch connected between positive supply voltage terminals 7 and a reset line 80. Reset line 80 is connected to the control grid of thyratron 1 through a diode rectifier 81 and a resistor 82 connected in series, and is connected to the control grid of the first or right section of vacuum tube 33 through a diode rectifier 83 and a resistor 84 connected in series, as shown. Rectifiers 81 and 83 are poled to conduct current from line 80 to the control grids of thyratron 1 and the right section of tube 33 when reset line 80 is made positive by closing switch 10 momentarily.

Assume that thyratron 1 and the right section of tube 33 are initially conductive. The cathode potential of thyratron 1 positive with respect to reference potential line 6 because of the voltage drop across resistors 15 and 16, and the anode potential of the right section of tube 33 is negative with respect to reference potential line 6 because of the voltage drop across resistor 34. Consequently, a sufficiently large voltage is applied across resistor 69 and lamp 59 in series to light lamp 59. This initial circuit condition may represent the numeral zero.

Now assume that there is supplied to additive input terminal 55 a negative pulse of sufficient amplitude to cut off momentarily the left section of tube 48. The potential of input line 11 rises suddenly to supply an additive input positive electric pulse to the scale-of-five counting ring. This transfers the conduction of current from thyratron 1 to thyratron 2, lamp 59 is extinguished, and lamp 60 is lit. This circuit condition represents the numeral one, and indicates a difference of one between the cumulative number of additive input pulses (1) and the cumulative number of subtractive input pulses (0) received by the decade counter up to that time.

Other successive input pulses supplied to additive input terminal 5 transfer the conduction of current successively to thyratrons 3, 4, and 5; and lamps 61, 62 and 63 are lit in succession to display continuously the cumulative net number of pulses counted.

The next additive input pulse received at terminal 55 produces a positive transfer pulse at transfer terminal 20, and a positive electric pulse is transmitted through coupling capacitor 21 to the control grid of thyratron 1 so that the conduction of current is transferred directly from thyratron 5 to thyratron 1. Simultaneously, a positive electric pulse is transmitted through rectifier 44, carry line 43, and rectifier 47 to the left control grid of tube 33, which triggers the bistable flip-flop so that the conduction of current is transferred from the right section to the left section of tube 33. Now lamp 64 is lit, which indicates that the number of additive input pulses (6) received up to that time exceeds the number of subtractive input pulses (0) by six.

As thyratron 5 became nonconductive, a negative pulse was transmitted from its cathode through coupling capacitor 77 to output terminal 74; but at the same time the right section of tube 33 became nonconductive and transmitted a positive pulse through capacitor 76 to terminal 74. The positive and negative pulses thus transmitted substantially simultaneously to output terminal 74 practically cancel each other, so that any net pulse supplied to terminal 74 at this time is of insufficient amplitude to trigger a following decade. As the left section of tube 33 became conductive, it transmitted a negative electric pulse through capacitor 78 to output terminal 75; but at substantially the same time thyratron 1 became conductive and transmitted a positive pulse to terminal 75 through coupling capacitor 79. In this case also, the two substantially simultaneous pulses of opposite polarity practically cancel each other. Consequently, no appreciable pulse is supplied to output terminals 74 and 75 at the count of six.

Other pulses supplied successively to additive input terminal 55 transfer the conduction of current successively to thyratrons 2, 3, 4 and 5, and lamps 65, 66, 67 and 68 are lit in succession to represent the numerals six, seven, eight and nine.

The next input pulse supplied to additive input terminal 55 transfers the conduction of current directly from thyratron 5 to thyratron 1. Simultaneously, a positive pulse is supplied through carry line 43 that triggers the flip-flop and transfers the conduction of current from the left section to the right section of tube 33. Now lamp 59 is lit again, and this decade is back in its initial circuit state.

However, at this tenth count thyratron 5 and the right section of tube 33 both transmitted negative electric pulses to output terminal 74, and as a result for a fairly large negative electric pulse was provided at terminal 74 for additively triggering the following decade. Simultaneously with the negative carry pulse supplied to terminal 74, a positive pulse is supplied to terminal 75, but positive pulses have no material effect upon the following decade. The following decade will now indicate a count of one, while the decade illustrated in the drawing indicates a count of zero. Thus the two decades in tandem display a count of ten, which correctly indicates that up to this time the cumulative number of input pulses (10) supplied to additive input terminal 55 exceeds the cumulative number of input pulses (0) supplied to subtractive input terminal 56 by the number ten.

Now assume that an input negative pulse is supplied to subtractive input terminal 56. This negative pulse cuts off the right section of tube 48, and the potential of subtractive input line 12 of the thyratron counting ring increases suddenly to provide a positive electric pulse at reverse transfer terminal 14. A positive electric pulse is now transmitted through capacitor 32 to the control grid of thyratron 5, so that the conduction of current is transferred directly from thyratron 1 to thyratron 5; and, simultaneously, a positive electric pulse is transmitted through rectifier 45, carry line 43, and rectifiers 46 and 47 to trigger the flip-flop so that the conduction of current is transferred from the right section to the left section of tube 33. Now lamp 68 is lit to indicate the numeral nine.

As thyratron 1 becomes nonconductive, a negative electric pulse is transmitted through coupling capacitor 79 to output terminal 75, and, substantially simultaneously therewith, as the left section of tube 33 becomes conductive, a negative electric pulse is transmitted through coupling capacitor 78 to terminal 75. The two negative pulses thus transmitted substantially simultaneously to terminal 75 supply a relatively large-amplitude negative electric pulse to the subtractive input terminal of the following decade, so that the indication of the following decade returns to zero.

Thus, the two decades in tandem now display the number nine, which correctly indicates that the cumulative number of input pulses (10) supplied to additive input terminal 55 exceeds the cumulative number of input pulses (1) supplied to subtractive input terminal 56 up to this time by the number nine. Successive input pulses may be supplied to terminals 55 and 56 selectively in any sequence, and the pulse counter will continuously display the numerical difference between the cumulative number of pulses supplied to terminal 55 and the cumulative number of pulses supplied to terminal 56.

When it is desired to reset the counter to its initial circuit condition, representing the number zero, reset switch 10 is closed momentarily. When switch 10 is closed, positive voltages are supplied to the control grids of thyratron 1 and the right section of tube 33, whereupon the circuit is reset to its initial or zero state.

It should be understood that this invention in its broader aspects is not limited to the specific embodiment herein illustrated and described, and that the following claims are intended to cover all changes and modifications that do not depart from the true spirit and scope of the invention.

What is claimed is:

1. A pulse counter comprising an input line; means for supplying input positive electric pulses to said input line; a supply terminal providing a positive electric potential relative to said input line; and a plurality of circuit stages arranged in sequence; each of said stages including an electric discharge device having an anode and a control electrode and a cathode, a transfer terminal, a resistor connected between said cathode and said transfer terminal, an asymmetrically conductive device connected between said transfer terminal and said input line, said asymmetrically conductive device being poled for the best conduction of current from said cathode to said input line, and coupling means connecting said control electrode to the transfer terminal of the preceding one in sequence of said stages; the anodes of all of said stages being connected together; a resistor connected between said anodes and said supply terminal; the resistance of said last-mentioned resistor being such that only one at a time of said discharge devices can continually conduct substantial current; whereby the conduction of current is successively transferred from one to another in sequence of said stages responsive to successive input pulses.

2. A pulse counter comprising an input line; a reference potential line; means normally maintaining said input line at an electric potential substantially equal to that of said reference potential line; means for selectively supplying input positive electric pulses to said input line; a supply terminal providing a positive electric potential relative to said reference potential line; and a plurality of circuit stages arranged in continuous repeating sequence to form a counting ring; each of said stages including a thyratron having an anode and a shield grid and a control grid and a cathode, a transfer terminal, a resistor connected between said cathode and said transfer terminal, a rectifier connected between said transfer terminal and said input line, said rectifier being poled to conduct current from said cathode to said input line, so that said input line is part of a principal cathode return circuit for said thyratron, a capacitor connected between said cathode and said reference potential line, a resistor connected between said control electrode and said cathode, a capacitor connected between said control electrode and the transfer terminal of the preceding one in sequence of said stages, and a resistor connected between said screen electrode and said reference potential line; the anodes of all of said stages being connected together; a resistor connected between said anode and said supply terminal; the resistance of said last-mentioned resistor being such as to permit stable conduction of substantial current by only one at a time of said thyratrons; whereby each input pulse supplied to said input line transfers the conduction of current from a previously conducting one to the following one in sequence of said stages.

3. A differential pulse counter comprising: an additive pulse input line; a subtractive pulse input line; an anode supply circuit; and a plurality of circuit stages arranged in sequence; each of said stages including an electric discharge device having an anode and a control electrode and a cathode, a forward transfer terminal, a reverse transfer terminal, a resistor connected between said cathode and said forward transfer terminal, a resistor connected between said cathode and said reverse transfer terminal, an asymmetrically conductive device connected between said forward transfer terminal and said additive input line, an asymmetrically conductive device connected between said reverse transfer terminal and said subtractive input line, said asymmetrically conductive devices being poled for best conduction of current from said cathode to said input lines, coupling means connecting said control electrode to the forward transfer terminal of the preceding one in sequence of said stages, and coupling means connecting said control electrode to the reverse transfer terminal of the following one in sequence of said stages, said anode being connected to said anode supply circuit; said anode supply circuit being common to all of said stages and permitting stable conduction of substantial current by only one at a time of said discharge devices.

4. A differential pulse counter comprising: an additive pulse input line; a subtractive pulse input line; a supply terminal providing a positive electric potential relative to said input lines; a plurality of circuit stages arranged in continuous repeating sequence to form a counting ring; each of said stages including a thyratron having an anode and a control grid and a cathode, a forward transfer terminal, a reverse transfer terminal, a resistor connected between said cathode and said forward transfer terminal, a resistor connected between said cathode and said reverse transfer terminal, a rectifier connected between said forward transfer terminal and said additive input line, a rectifier connected between said reverse transfer terminal and said subtractive input line, said rectifiers being poled for conduction of current from said cathode to said input lines so that said input lines are parts of the principal cathode return circuits for said thyratron, a capacitor connected between said control grid and the forward transfer terminal of the preceding stage, and a capacitor connected between said control grid and the reverse transfer terminal of the following stage; the anodes of all of said stages being connected together; and a resistor connected between said anodes and said supply terminal; the resistance of said last-mentioned resistor being such that only one at a time of said stages can continually conduct substantial current; whereby each input positive electric pulse supplied to said additive input line transfers the conduction of current from a previously conducting one to the following one in sequence of said stages and each input positive electric pulse supplied to said subtractive input line transfers the conduction of current from a previously conducting one to the preceding one in sequence of said stages.

5. A differential pulse counter comprising: a reference potential line; an additive pulse input line; a subtractive pulse input line; means for selectively supplying input positive electric pulses to respective ones of said input lines; a supply terminal providing a positive electric potential relative to said reference potential line and said input lines; a plurality of circuit stages arranged in a counting ring; each of said stages including a thyratron having an anode and a shield grid and a control grid and a cathode, a forward transfer terminal, a reverse transfer terminal, two resistors connected between said cathode and respective ones of said two transfer terminals, a rectifier connected between said forward transfer terminal and said additive input line, a rectifier connected between said reverse transfer terminal and said subtractive input line, said rectifiers being poled for conduction of current from said cathode to said input lines, coupling means connected between said control grid and the forward transfer terminal of the preceding stage, coupling means connected between said control grid and the reverse transfer terminal of the following stage, and a resistor connected between said screen electrode and said reference potential line; and a common anode circuit connecting all of said stages to said supply terminal and permitting stable conduction of substantial current by only one at a time of said thyratrons.

6. A differential pulse counter comprising: a reference potential line; an additive pulse input line; a subtractive pulse input line; means for normally maintaining said input lines at electric potentials substantially equal to that of said reference potential line; means for selectively supplying input positive electric pulses to respective ones of said input lines; a supply terminal providing a positive electric potential relative to said reference potential line; a plurality of circuit stages arranged in continuous repeating sequence to form a counting ring; each of said stages including a thyratron having an anode and a shield grid and a control grid and a cathode, a forward transfer terminal, a reverse transfer terminal, a capacitor connected between said cathode and said reference potential line; a resistor connected between said cathode and said forward transfer terminal, a resistor connected between said cathode and said reverse transfer terminal, a diode rectifier connected between said forward transfer terminal and said additive input line, a diode rectifier connected between said reverse transfer terminal and said subtractive input line, said rectifiers being poled for conduction of current from said cathode to said input line so that said input lines are parts of two principal cathode return circuits for said thyratron, a resistor connected between said control grid and said cathode, a capacitor connected between said control grid and the forward transfer terminal of the preceding one in sequence of said stages, a capacitor connected between said control grid and the reverse transfer terminal of the following one in sequence of said stages, and a resistor connected between said shield grid and said reference potential line; the anodes of all of said thyratrons being connected together so that all of said stages have a common anode circuit; and a resistor connected between said anodes and said supply terminal; the resistance of said last-mentioned resistor being such as to permit stable conduction of substantial current by only one at a time of said thyratrons; whereby each input pulse supplied to said additive input line transfers the conduction of current from a previously conducting one to the following one in sequence of said stages and each electric pulse supplied to said subtractive input line transfers to conduction of current from a previously conducting one to the preceding one in sequence of said stages.

7. A differential pulse counter comprising: an additive input line; a subtractive input line; first and second voltage supply terminals; said first supply terminal being at a positive electric potential relative to said second supply terminal; first normally conductive input switching means connected between said additive input line and said second supply terminal; second normally conductive switching means connected between said subtractive input line and said second supply terminal; each of said input switching means being selectively operable to a non-conductive condition; a plurality of circuit stages arranged in sequence; each of said stages including an electric discharge device having an anode and a control electrode and a cathode, a forward transfer terminal, a reverse transfer terminal, a resistor connected between said cathode and said forward transfer terminal, a resistor connected between said cathode and said reverse transfer terminal, an asymmetrically conductive device connected between said forward transfer terminal and said additive input line, an asymmetrically conductive device connected between said reverse transfer terminal and said subtractive input line, said asymmetrically conductive devices being poled for best conduction of current from said cathode to said input lines, coupling means connecting said control electrode to the forward transfer terminal of the preceding one in sequence of said stages, and coupling means connecting said control electrode to the reverse transfer terminal of the following one in sequence of said stages; and a common anode circuit connected to all of said stages and permitting stable conduction of substantial current by only one at a time of said discharge devices; whereby each operation of said first input switching means to the non-conductive condition transfers the conduction of current to a following one in sequence of said discharge devices and each operation of said second input switching means to the non-conductive condition transfers the conduction of current to a preceding one in sequence of said discharge devices.

8. A differential pulse counter comprising: an additive input line; a subtractive input line; first and second voltage supply terminals; said first supply terminal being at a positive electric potential relative to said second supply terminal; first and second normally conducting electron discharge devices each having an anode and a control grid and a cathode; circuit means connecting the cathodes of said electron discharge devices to said second supply terminal; the anode of said first electron discharge device being connected to said additive input line; the anode of said second electron discharge device being connected to said subtractive input line; means for supplying negative electric pulses selectively to the respective control grids of said electron discharge devices to make selected ones of said devices non-conductive; a plurality of circuit stages arranged in continuous repeating sequence to form a counting ring; each of said stages including a thyratron having an anode and a control grid and a cathode, a forward transfer terminal, a reverse transfer terminal, a resistor connected between said cathode of the thyratron and said forward transfer terminal, a resistor connected between said cathode of the thyratron and said reverse transfer terminal, a rectifier connected between said forward transfer terminal and said additive input line, a rectifier connected between said reverse transfer terminal and said subtractive input line, said rectifiers being poled for conduction of current from said cathode to said input lines, a capacitor connected between said control electrode of the thyratron and the forward transfer terminal of the preceding stage, and a capacitor connected between said control electrode of the thyratron and the reverse transfer terminal of the following stage; the anodes of all of said stages being connected together; and a resistor connected between said anodes of the thyratrons and said first supply terminal; the resistance of said last-mentioned resistor being such that only one at a time of said stages can continually conduct substantial current; whereby each negative pulse supplied to the control grid of said first electron discharge device transfers the conduction of current from a previously conducting one to the following one in sequence of said thyratrons and each negative pulse supplied to the control grid of said second electron discharge device transfers the conduction of current from a previously conducting one to the preceding one in sequence of said thyratrons.

9. A differential pulse counter comprising: an additive input line; a subtractive input line; a reference potential line; first and second supply terminals; said first supply terminal being at a positive electric potential and said second supply terminal being at a negative electric potential relative to said reference potential line; first and second vacuum tube section each having an anode and a control grid and a cathode; a resistor connected between the cathode of said first tube section and said second supply terminal; a resistor connected between the cathode of said second tube section and said second supply terminal; a resistor connected between the control grid of said first tube section and said second supply terminal; a resistor connected between the control grid of said second tube section and said second supply terminal; a rectifier connected between said reference potential line and the anode of said first tube section; a rectifier connected between said reference potential line and the anode of said second tube section; the aforesaid rectifiers being poled for the conduction of current from said reference potential line to the aforesaid anodes; said additive input line being connected to the anode of said first tube section and said subtractive input line being connected to the anode of said second tube section; said tube sections being normally conductive to maintain said input lines normally at electric potentials substantially equal to that of said reference potential line; connections for selectively supplying negative electric pulses to the respective control grids of said tube sections to make selective ones of said sections momentarily non-conductive for applying positive pulses to selective ones of said input lines; a plurality of circuit stages arranged in a counting ring; each of said stages including a thyratron having an anode and a shield grid and a control grid and a cathode, a forward transfer terminal, a reverse transfer terminal, two resistors connected between said cathode of the thyratron and respective ones of said transfer terminals, a rectifier connected between said forward transfer terminal and said additive input line, a rectifier connected between said reverse transfer terminal and said subtractive input line, said last-mentioned two rectifiers being poled for conduction of current from said cathode to said input lines, whereby said input lines are parts of the two principal cathode return circuits of said thyratron, coupling means connected between said control grid of the thyratron and the forward transfer terminal of the preceding one in sequence of said stages, coupling means connected between said control grid of the thyratron and the reverse transfer terminal of the following one in sequence of said stages, and a resistor connected between said shield grid and said reference potential line; the anodes of all of said thyratrons being connected together so that all of said stages have a common anode circuit; and a resistor connected between said anodes of the thyratrons and said first supply terminal; the resistance of said last-mentioned resistor being such as to permit stable conduction of substantial current by only one at a time of said thyratrons.

10. A differential decade pulse counter comprising an additive pulse input line, a subtractive pulse input line, circuit means for selectively supplying input electric pulses to respective ones of said input lines, five circuit stages arranged in continuous repeating sequence to form a scale-of-five counting ring, circuit means permitting stable conduction of substantial current by only one at a time of said five stages, coupling means for transferring the conduction of current from a previously conducting one to the following one in sequence of said five stages responsive to each input pulse supplied to said additive input line, coupling means for transferring the conduction of current from a previously conducting one to the preceding one in sequence of said five stages responsive to each input pulse supplied to said subtractive input line, a carry pulse transmission line, coupling means for supplying an electric pulse to said carry line each time that the conduction of current is transferred directly from the fifth to the first in sequence of said five stages, coupling means for supplying an electric pulse to said carry line each time that the conduction of current is transferred directly from the first to the fifth in sequence of said five stages, a scale-of-two counting circuit having two stable operating states, and means for triggering said scale-of-two circuit from one to the other of said two operating states responsive to each electric pulse supplied to said carry line.

11. A differential decade pulse counter comprising: an additive pulse input line; a subtractive pulse input line; five circuit stages arranged in continuous repeating sequence to form a scale-of-five counting ring; each of said stages including an electric discharge device having an anode and a control electrode and a cathode, a forward transfer terminal, a reverse transfer terminal, a resistor connected between said cathode and said forward transfer terminal, a resistor connected between said cathode and said reverse transfer terminal, an asymmetrically conductive device connected between said forward transfer terminal and said additive input line, an asymmetrically conductive device connected between said reverse transfer terminal and said subtractive input line, the aforesaid asymmetrically conductive devices being poled for best conduction of current from said cathode to said input lines, coupling means connecting said control electrode to the forward transfer terminal of the preceding one in sequence of said stages, and coupling means connecting said control electrode to the reverse transfer terminal of the following one in sequence of said stages; a common anode circuit connected to all of said stages and permitting the stable conduction of substantial current by only one at a time of said discharge devices; whereby the conduction of current is transferred from a previously conducting one to the following one in sequence of said stages responsive to each input pulse supplied to said additive input line and is transferred from a previously conducting one to the preceding one in sequence of said stages responsive to each input pulse supplied to said subtractive input line; a carry pulse transmission line; an asymmetrically conductive device connected between the forward transfer terminal of the fifth in sequence of said five stages and said carry line; an asymmetrically conductive device connected between the reverse transfer terminal of the first in sequence of said five stages and said carry line; said last-mentioned two asymmetrically conductive devices being poled for best conduction of current from said transfer terminals to carry line; whereby an electric pulse is supplied to said carry line each time that the conduction of current is transferred directly from said fifth stage to said first stage and each time that the conduction of current is transferred directly from said first stage to said fifth stage; a bistable trigger circuit having two stable operating states; and means for triggering said bistable circuit from one to the other of said two states responsive to each pulse supplied to said carry line.

12. A differential decade pulse counter comprising: an additive pulse input line; a subtractive pulse input line; a supply terminal providing a positive electric potential relative to said input lines; five circuit stages arranged in continuous repeating sequence to form a scale-of-five counting ring; each of said stages including a thyratron having an anode and a control grid and a cathode, a forward transfer terminal, a reverse transfer terminal, a resistor connected between the aforesaid cathode and said forward transfer terminal, a resistor connected between the aforesaid cathode and said reverse transfer terminal, a rectifier connected between said forward transfer terminal and said additive input line, a rectifier connected between said reverse transfer terminal and said subtractive input line, the aforesaid rectifiers being poled for conduction of current from said cathode to said input lines, a capacitor connected between the aforesaid control grid and the forward transfer terminal of the preceding one in sequence of said stages, and a capacitor connected between the aforesaid control grid and the reverse transfer terminal of the following one in sequence of said stages; the anodes of all of said stages being connected together; a resistor connected between the aforesaid anodes and said supply terminal; the resistance of said last-mentioned resistor being such that only one at a time of said stages can continually conduct substantial current; whereby each input positive electric pulse supplied to said additive input line transfers the conduction of current from a previously conducting one to the following one in sequence of said stages and each input positive electric pulse supplied to said subtractive input line transfers the conduction of current from a previously conducting one to the preceding one in sequence of said stages; a carry pulse transmission line; a rectifier connected between the forward transfer terminal of the fifth in sequence of said five stages and said carry line; a rectifier connected between the reverse transfer terminal of the first in sequence of said five stages and said carry line; said last-mentioned two rectifiers being poled for conduction of current from said transfer terminals to said carry line; whereby a positive electric pulse is supplied to said carry line each time that the conduction of current is transferred directly from said fifth stage to said first stage and each time that the conduction of current is transferred directly from said first stage to said fifth stage; a bistable trigger circuit including two vacuum tube sections each having an anode and a control grid and a cathode; said trigger circuit having two stable operating states and being triggered from one to the other of said states each time that positive electric pulses are supplied to its control grids; and two rectifiers connected between said carry line and respective ones of the two control grids of said trigger circuit; said last-mentioned two rectifiers being poled to conduct positive electric pulses from said carry line to said control grids.

13. A differential decade pulse counter comprising an additive pulse input line, a subtractive pulse input line, a reference potential line, five circuit stages coupled together as a scale-of-five pulse counting ring in which only one at a time of said stages can continually conduct substantial current, coupling means for transferring the conduction of current from a previously conducting one to the following one in sequence of said five stages responsive to each input pulse supplied to said additive input line, coupling means for transferring the conduction of current from a previously conducting one to the preceding one in sequence of said five stages responsive to each input pulse supplied to said subtractive input line, a bistable circuit having first and second circuit sections forming a scale-of-two pulse counting device in which only one at a time of said sections can continually conduct substantial current, means triggering said bistable circuit to transfer the conduction of current from one to the other of said two sections each time that the conduction of current is transferred from the first to the fifth in sequence of said five stages and each time that the conduction of current is transferred from the fifth to the first sequence of said five stages, whereby said scale-of-five circuit and said scale-of-two device together form a differential decade pulse counter, the first and fifth in sequence of said five stages each having an output circuit supplying a negative electric pulse whenever the conduction of current is transferred away from that stage, said first and second sections each having an output circuit supplying a negative electric pulse whenever the conduction of current is transferred to that section, first and second output terminals, a capacitor connected between said first output terminal and said output circuit of the fifth in sequence of said five stages, a capacitor connected between said first output terminal and said output circuit of said first section, a capacitor connected between said second output terminal and said output circuit of the first in sequence of said five stages, and a capacitor connected between said second output terminal and said output circuit of said second section, whereby additive carry pulses are supplied to said first output terminal and subtractive carry pulses are supplied to said second output terminal.

14. A decade pulse counter comprising a reference potential line, five circuit stages coupled together as a scale-of-five pulse counting ring in which only one at a time of such stages can continually conduct substantial current, each of said five stages including a cathode circuit supplying an electric potential that is substantially positive relative to said reference potential line only when that stage is conductive, a bistable circuit having first and second circuit sections forming a scale-of-two pulse counting device in which only one at a time of said sections can continually conduct substantial current, said bistable circuit being coupled in tandem with said scale-of-five counting ring to form a decade pulse counter, each of said two sections including an anode circuit supplying an electric potential that is substantially negative relative to said reference potential line only when that section is conductive, ten indicator lamps arranged in sequence, each of said lamps having a first and a second terminal for receiving voltage to light the lamp, circuit means connecting the cathode circuit of the first in sequence of said stages to the first terminals of the first and sixth in sequence of said lamps, circuit means connecting the cathode circuit of the second in sequence of said five stages to the first terminals of the second and seventh in sequence of said lamps, circuit means connecting the cathode circuit of the third in sequence of said five stages to the first terminals of the third and eighth in sequence of said lamps, circuit means connecting the cathode circuit of the fourth in sequence of said stages to the first terminals of the fourth and ninth in sequence of said lamps, circuit means connecting the cathode circuit of the fifth in sequence of said five stages to the first terminals of the fifth and tenth in sequence of said lamps, circuit means connecting the anode circuit of said first section to the second terminals of the first five in sequence of said lamps, and circuit means connecting the anode circuit of said second section to the second terminals of the second five in sequence of said lamps, whereby only one at a time of said lamps is lit for indicating the cumulative number of pulses counted by said decade counter.

15. A differential decade pulse counter comprising: a reference potential line; an additive pulse input line; a subtractive pulse input line; means for normally maintaining said input lines at electric potentials substantially equal to that of said reference potential line; means for selectively supplying input positive electric pulses to respective ones of said input lines; first and second voltage supply terminals; said first supply terminal being at a positive electric potential relative to said second supply terminal; five circuit stages arranged in a scale-of-five counting ring; each of said stages including a thyratron having an anode and a shield grid and a control grid and a cathode, a forward transfer terminal, a reverse transfer terminal, two resistors connected between the aforesaid cathode and respective ones of said two transfer terminals, a rectifier connected between said forward transfer terminal and said additive input line, a rectifier connected between said reverse transfer terminal and said subtractive input line, the aforesaid two rectifiers being poled for conduction of current from said cathode to said input lines, coupling means connected between the aforesaid control grid and the forward transfer terminal of the preceding one in sequence of said stages, coupling means connected between the aforesaid control grid and the reverse transfer terminal of the following one in sequence of said stages, and a resistor connected between said shield grid and said reference potential line; the anodes of all of said thyratrons being connected together so that all of said stages have a common anode circuit; a resistor connected between the aforesaid anodes and said first supply terminal; the resistance of said last-mentioned resistor being such as to permit stable conduction of substantial current by only one at a time of said thyratrons; whereby each input pulse supplied to said additive input line transfers the conduction of current from a previously conducting one to the following one in sequence of said five stages and each input pulse supplied to said subtractive input line transfers the conduction of current from a previously conducting one to the preceding one in sequence of said five stages; a carry pulse transmission line; a rectifier connected between the forward transfer terminal of the fifth in sequence of said five stages and said carry line; a rectifier connected between the reverse transfer terminal of the first in sequence of said five stages and said carry line; said last-mentioned two rectifiers being poled for conduction of current from said transfer terminals to said carry line; whereby an electric pulse is supplied to said carry line each time that the conduction of current is transferred directly from said fifth stage to said first stage and each time that the conduction of current is transferred directly from said first stage to said fifth stage; and a bistable trigger circuit including first and second vacuum tube sections each having an anode and a control grid and a cathode, the cathodes of said two tube sections being connected together, two resistors connected between said reference potential line and respective ones of said last-mentioned two anodes, a resistor connected between the anode of said first tube section and the control grid of said second tube section, a resistor connected between the anode of said second tube section and the control grid of said first tube section, a circuit junction, a resistor connected between said last-mentioned cathodes and said circuit junction, two resistors connected between said circuit junction and respective ones of said last-mentioned two control grids, a resistor connected between said circuit junction and said second supply terminal, and two rectifiers connected between said carry line and respective ones of said last-mentioned two control grids, said rectifiers being poled for conduction of positive electric pulses from said carry line to said control grids; said trigger circuit having two stable operating states and being triggered from one to the other of said states by each positive electric pulse supplied to said carry line.

16. A differential decade pulse counter as defined in claim 15, having first and second pulse output terminals, a capacitor connected between said first output terminal and the cathode of the fifth in sequence of said thyratrons, a capacitor connected between said first output terminal and the anode of said first vacuum tube section, a capacitor connected between said second output terminal and the cathode of the first in sequence of said thyratrons, and a capacitor connected between said second output terminal and the anode of said second vacuum tube section.

17. A differential decade pulse counter as defined in claim 15, having ten indicator lamps connected in sequence, each of said lamps having first and second terminals for receiving voltage to light the lamp, a resistor connected between the cathode of the first in sequence of said thyratrons and the first terminals of the first and sixth in sequence of said lamps, a resistor connected between the cathode of the second in sequence of said thyratrons and the first terminals of the second and seventh in sequence of said lamps, a resistor connected between the cathode of the third in sequence of said thyratrons and the first terminals of the third and eighth in sequence of said lamps, a resistor connected between the cathode of the fourth in sequence of said thyratrons and the first terminals of the fourth and ninth in sequence of said lamps, and a resistor connected between the cathode of the fifth in sequence of said thyratrons and the first terminals of the fifth and tenth in sequence of said lamps, the second terminals of the first five in sequence of said lamps being connected together and being connected to the anode of said first vacuum tube section, the second terminals of the second five in sequence of said lamps being connected together and being connected to the anode of said second vacuum tube section, whereby said lamps are lit one at a time to indicate a numerical difference between the number of electric pulses supplied to said additive input line and the number of pulses supplied to said subtractive input line.

References Cited in the file of this patent

UNITED STATES PATENTS

| | | |
|---|---|---|
| 2,485,825 | Grosdoff | Oct. 25, 1949 |
| 2,533,739 | Mumma | Dec. 12, 1950 |
| 2,540,024 | Bergfors | Jan. 30, 1951 |
| 2,690,302 | Nolde | Sept. 28, 1954 |